UNITED STATES PATENT OFFICE.

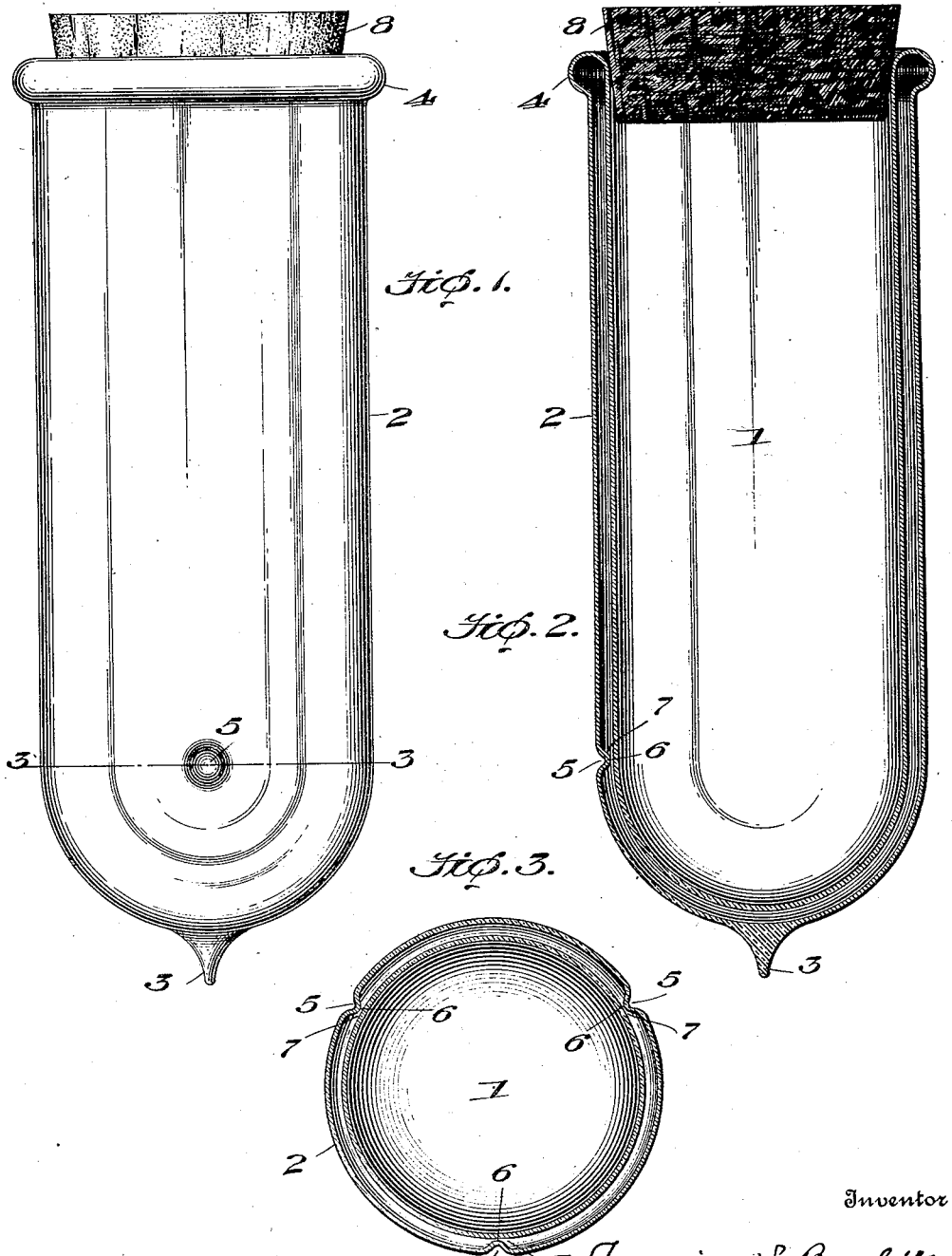

FREDERICK W. BARTLETT, OF CALDWELL, NEW JERSEY.

VACUUM-JAR.

1,204,838.  Specification of Letters Patent.  Patented Nov. 14, 1916.

Application filed December 24, 1915. Serial No. 68,500.

*To all whom it may concern:*

Be it known that I, FREDERICK W. BARTLETT, a citizen of the United States, residing at 43 Overlook road, Caldwell, in the county of Essex and State of New Jersey, have invented certain new and useful Improvements in Vacuum-Jars, of which the following is a specification.

This invention relates to glass double-walled vacuum receptacles, and one of its objects is to provide a vacuum receptacle in which supplemental inserted spacing devices or members between the inner and outer walls of said receptacle are entirely dispensed with, thereby not only eliminating an item of added expense in the manufacture of the receptacles, but also greatly increasing the temperature-retaining efficiency of the container by providing a normally uninterrupted space between the outer and inner walls of the receptacle.

A further object is to provide a vacuum receptacle having a pouring lip or bead around its mouth, particularly in a receptacle whose internal diameter is substantially the same at its mouth as in its body.

Instead of providing spacing devices or members between the inner and outer walls of the receptacle, I provide indentations in one of the walls of the receptacle which form protuberances extending toward, but not normally touching, the other wall of the receptacle. In practice, the ends of these protuberances will be separated from the other wall of the receptacle by a very small distance, say, one-half millimeter, consequently, these protuberances serve as spacers and reinforcing devices, taking the place of inserted spacers, but they do not normally touch the opposite wall and there is no contact of glass upon glass, and hence no danger of breakage or fracture. However, the distance, usually one-half millimeter, normally existing between the protuberances and the opposite wall of the receptacle is sufficient to compensate for any expansion of the glass. Furthermore, the distance is so slight that the protuberances constitute effective reinforcing and bracing means serving the purpose usually performed by spacers or fillers, for the reason that before the glass at the neck of the container, which necessarily bears the strain of holding the inner wall, has reached its limit of expansion, one at least of the protuberances will temporarily come in contact with the other wall and thus prevent further movement. The indentations and protuberances are preferably located at the lower portion of the receptacle, but they may be disposed at other points or at the lower portion of the receptacle and also at points higher up. Ordinarily they are arranged at the lower portion only because the improved pouring lip which I provide at the mouth of the receptacle forms a connection and brace between the inner and outer walls of the receptacle at that point.

The pouring lip constitutes a part of the present invention and is circular and continuous at the mouth of the receptacle and hollow throughout. This lip prevents any fracture of the receptacle at this point, gives additional strength to the receptacle and enables all drops of the liquid to be caught on a cup or spoon when pouring.

My invention is particularly adapted for embodiment in a receptacle capable of use either as a liquid or a food container, and in one which is of substantially the same internal diameter throughout, as distinguished from bottles having a contracted neck. I wish it understood, however, that the invention is not limited to embodiment in a wide mouthed receptacle, but can be provided on a vacuum bottle, carafe, jug, pitcher, fireless cooker, or other glass vacuum receptacle or container.

In the accompanying drawings Figure 1 is a side elevation of a receptacle embodying my invention and having in this instance the form of a jar. Fig. 2 is a vertical section of the same, and Fig. 3 is a horizontal section on line 3—3, Fig. 1.

The inner and outer walls 1 and 2 constituting the vacuum jar are substantially cylindrical, except at their bottoms where they are rounded. The sealed projection which is provided after exhaustion is shown at 3. The inner and outer walls are joined by a complete or annular hollow pouring lip, or rounded bead 4 which gives strength to the jar and enables pouring to be accomplished with facility and all the drops of liquid to be drained off.

No spacing, filling or cushioning devices are provided between the inner and outer walls in the vacuum space, but I provide in one of such walls, preferably the outer one, indentations 5 which form projections or protuberances 6 extending toward the opposite wall and almost to it, but separated from said wall by a very slight space, as at 7. This space is, in practice, about one-half millimeter in extent which is sufficient to prevent contact of the inner wall with the protuberances under normal conditions. This is a matter of very great importance in the practical operation of these devices, because any spacing element which extends entirely across the interwall space forms a conductor of temperature which assists materially in lowering the efficiency of the receptacle as a heat insulator. Under the greatest usual expansion of the inner wall, the protuberances will barely touch the wall opposite to them. Moreover, they constitute a spacing and bracing means which will prevent any dangerous vibration of the inner wall, but as there is no usual contact of glass on glass, danger of fracture is eliminated. The indentations and projections are usually provided at the lower portion of the jar and in about the same transverse plane, but other indentations and projections may be provided at other points of the jar or both at the lower portion of the jar and at points higher up thereon, within the purview of the invention. Any suitable stopper or closure may be provided such, for instance, as the cork 8. The walls of the receptacle are provided with the usual silver or mercury coating, not shown.

My jar is as well adapted for holding food or solid material as it is for containing liquids.

In referring to the invention as a "jar" in the foregoing description and in the claims, I also intend to cover its use on bottles, carafes, and in short any glass doubled walled receptacle.

Having thus described my invention, what I claim as new and desire to secure by Letters Patent, is:

1. A vacuum jar comprising inner and outer walls joined together at their upper portion but otherwise free from each other, one wall being provided with indentations providing free projections or protuberances whose tips extend toward, but are normally slightly spaced from and out of contact with, the opposite wall.

2. A vacuum jar comprising inner and outer walls joined together at their mouths by an annular hollow pouring lip or bead, the outer wall being otherwise free from the inner wall and provided with inwardly extending indentations providing free internal projections or protuberances whose tips extend toward, but are normally slightly spaced from and out of contact with, the inner wall.

3. A vacuum jar comprising inner and outer walls of substantially the same diameter throughout and joined only at their outer ends by a hollow annular pouring lip or bead, said outer wall being otherwise free from the inner wall provided with inwardly extending indentations providing free internal projections or protuberances whose tips extend toward, but are normally slightly spaced from, and out of contact with, the inner wall.

In testimony whereof I affix my signature in presence of two witnesses.

FREDERICK W. BARTLETT.

Witnesses:
W. LOCKE ROCKWELL,
RAOUL H. DE RAISMES.